May 19, 1931.  K. M. JENSEN ET AL  1,806,352
POULTRY ROOST
Filed March 16, 1928  2 Sheets-Sheet 2
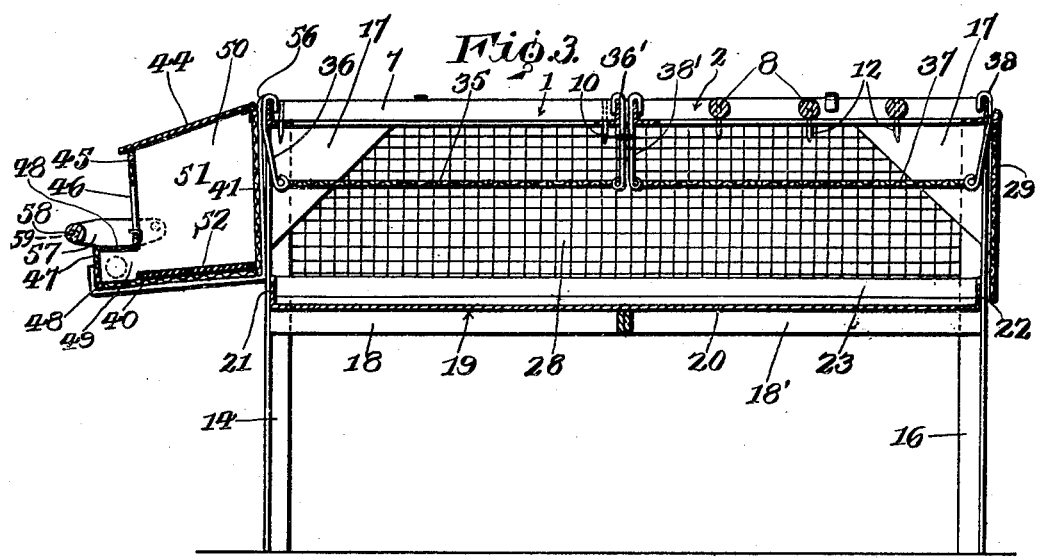
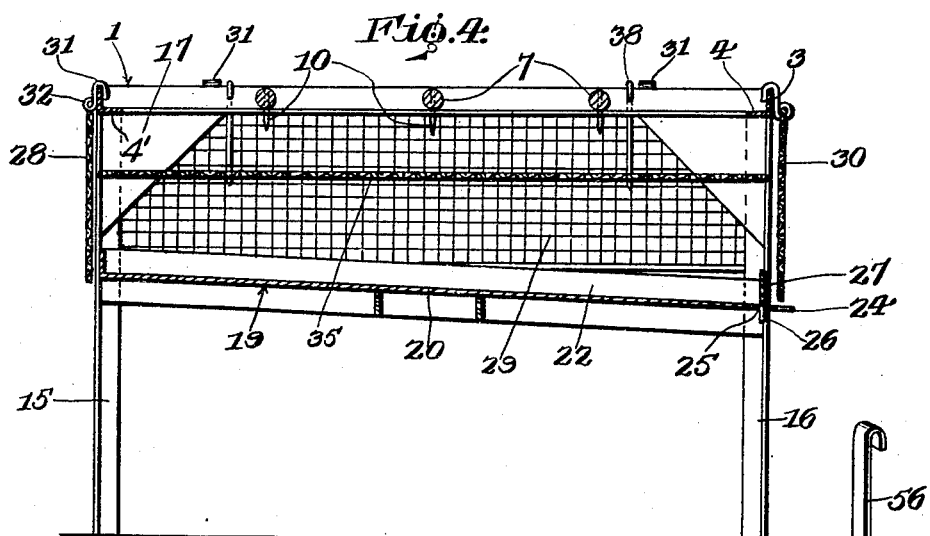
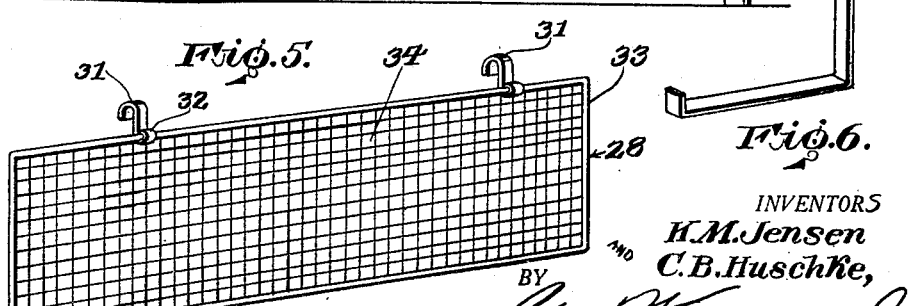
INVENTORS
K.M. Jensen
C.B. Huschke,
BY Geo. P. Kimmel
ATTORNEY.

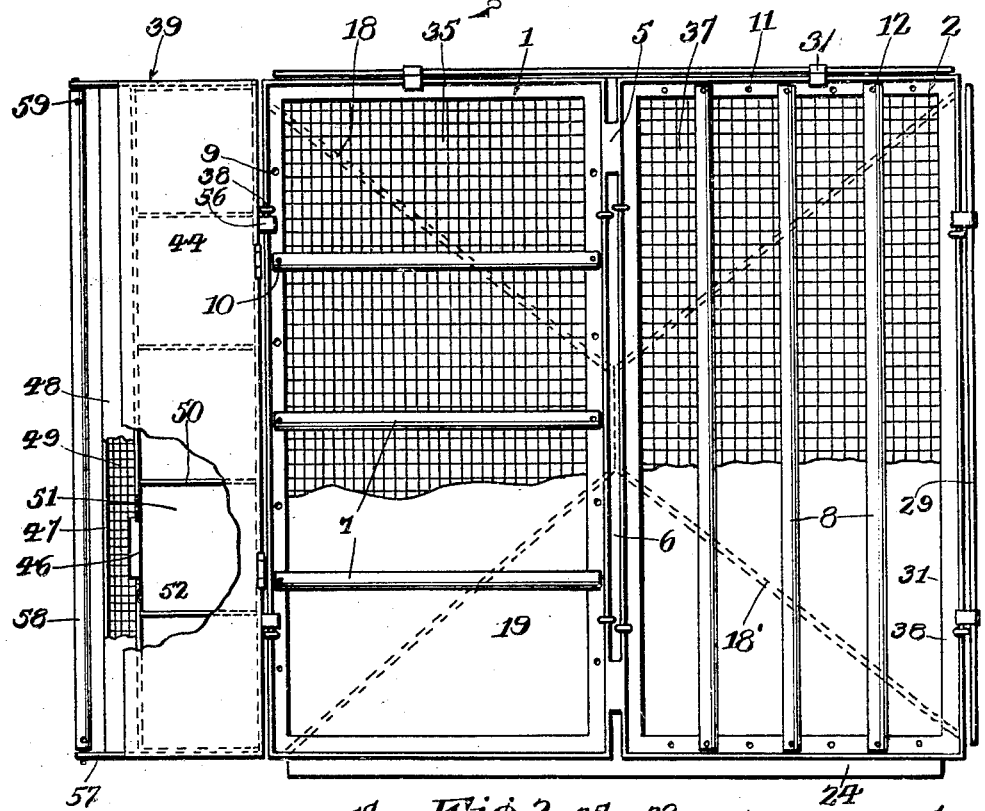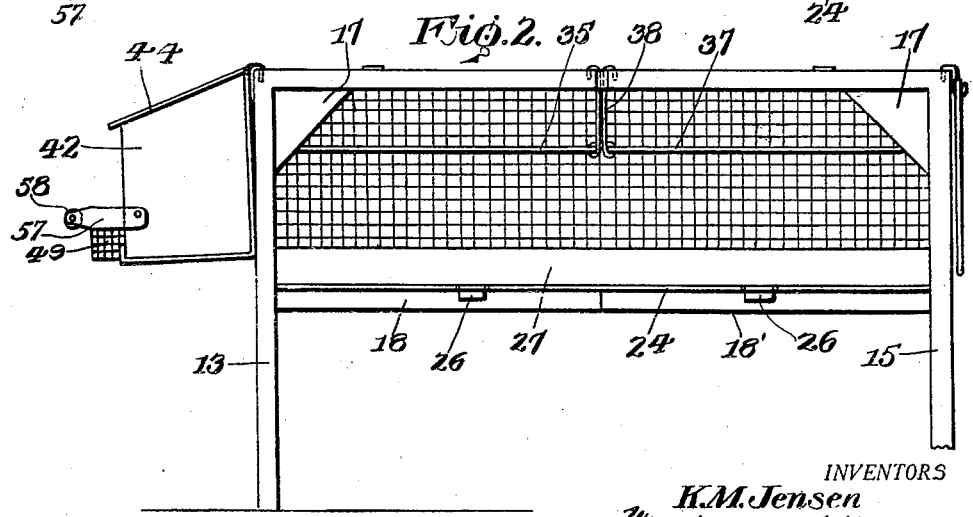

Patented May 19, 1931

1,806,352

UNITED STATES PATENT OFFICE

KRISTOFFER M. JENSEN AND CASPER B. HUSCHKE, OF MORGAN, MINNESOTA

POULTRY ROOST

Application filed March 16, 1928. Serial No. 262,218.

This invention relates to a poultry roost and has for its object to provide, in a manner as hereinafter set forth, a sanitary structure of such class including perch poles and means for the collection of the droppings of the fowl, and with the roost constructed and arranged so as to prevent the fowls from getting below the perch poles and into the droppings.

A further object of the invention is to provide, in a manner as hereinafter set forth, a sanitary poultry roost including means for collecting and preventing the droppings of the fowl from dissipation with respect to the roost and with the latter constructed and arranged to enable for the convenient cleaning of the droppings therefrom when desired.

A further object of the invention is to provide, in a manner as hereinafter set forth, a sanitary poultry roost including a nesting element constructed and arranged for shifting the laid eggs to a position whereby they can be conveniently removed when desired, and with the nest element supporting a perch for the fowl.

Further objects of the invention are to provide, in a manner as hereinafter set forth, a poultry roost which is simple in its construction and arrangement, strong, durable, compact, sanitary, thoroughly efficient when used, readily assembled, and comparatively inexpensive to manufacture.

With the foregoing and other objects in view the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

Figure 1 is a top plan view, partly broken away, of a poultry roost in accordance with this invention.

Figure 2 is a side elevation with one of the walls thereof removed.

Figure 3 is a longitudinal sectional view of the roost.

Figure 4 is a horizontal sectional view of the roost.

Figure 5 is a perspective view of one of the foraminous wall forming members.

Figure 6 is a perspective view of one of the hangers for the nesting element.

A poultry roost in accordance with this invention comprises a pair of rectangular frames 1, 2 disposed in sidewise arranged spaced relation and formed of metallic material. Each frame with respect to the end and side rails thereof, in cross section includes a vertically disposed leg 3 and a horizontally disposed leg 4 and with the latter extending inwardly at right angles with respect to the lower end of the former. The inner side rails of the frames oppose each other and are coupled together by combined spacing and coupling members 5, arranged in spaced relation and secured to said inner side rails in any suitable manner, preferably by welding. The members 5 provide a space 6 between the frames 1, 2.

Perch poles are supported from the frames 1, 2 and said poles may be disposed longitudinally or transversely with respect to the frames, but as illustrated the perch poles 7 supported by the frame 1 are disposed transversely thereof and seated on the horizontal legs 4 of the side rails of such frame, and the perch poles 8 supported by the frame 2 are disposed longitudinally thereof and mounted upon the horizontal legs 4 of the end rails of such frame. The horizontal legs 4 of the side rails of the frame 1 are provided with spaced openings 9 and with the openings in one horizontal leg arranged in alignment with the openings in the other horizontal leg. The openings 9 are provided for the reception of pins 10 carried by the ends of the poles 7 whereby these latter are detachably connected to the frame 1. The horizontal legs 4 of the end rails of the frame 2 are provided with spaced openings 11 and the openings in one leg 4 of one end rail of the frame 2 are arranged in alignment with the openings 11 in the leg 4 of the other end rail of the frame 2. The openings 11 are provided for the reception of pins 12 which are carried by the ends of the poles 8 whereby these latter are detachably connected to the frame 2. The openings 9 and 11 provide for adjustably spacing the perch poles with respect to each other.

Secured to the outer corners of the frame 1 are vertical supporting standards 13, 14 and secured to the outer corners of the frame 2 are vertical supporting standards 15, 16. The standards are of angle contour in cross section. Reinforcing corner pieces or plates 17 are secured to the frames 1 and 2 at the outer corners thereof and to the standards 13 to 16 both inclusive. The standards and corner pieces are constructed of metallic material.

The perch poles 7 and 8 preferably are constructed of wood and are of cylindrical cross section. The poles 7 are of a length to extend from the inner face of one vertical leg of a side rail of the frame 1 to the inner face of the other vertical leg of the side rail of such frame. The perch poles 8 are of a length to extend from the inner face of the vertical leg of an end rail of the frame 2 to the inner face of the vertical leg of the other end rail of said frame.

Oppositely disposed V-shaped brace members 18, 18' are provided for the standards. The members 18, 18' are connected together and are also connected to the standards. The brace member 18 is connected to the standards 13, 14 intermediate the ends thereof and the brace member 18' is connected to the standards 15, 16 intermediate the ends thereof. The brace members 18 and 18' abut each other at the inner ends thereof and are fixedly secured together, at such point, preferably by welding. The brace members 18, 18' also constitute a support for the bottom of a collecting pan 19 which is arranged below the perch poles and is provided for the reception of the droppings from the fowl.

The pan 19 includes a bottom 20 and side walls 21, 22 and 23 extending upwardly from three sides of the bottom 20. That side of the bottom 20 not provided with an upstanding wall is formed with an extension 24 of less width than the width of the bottom and with the extension 24 positioned between the legs 13, 15 as well as projecting outwardly therefrom. The walls 21, 22 and 23 are positioned between the supporting standards, that is against the inner faces thereof, as well as being secured thereto. The bottom of the pan is mounted on the braces 18, 18'. The extension 24 is formed with a series of spaced slots 25 through which extend depending lugs 26 carried by a wall forming member 27, which when in position is arranged between the legs of the standards 13, 15. The pan 19 inclines downwardly from the wall 23 toward the standards 13, 15. See Figure 4. The wall forming member 27, in connection with the walls 21, 22 and 23 provide means for retaining the droppings in the pan so that they cannot be dissipated therefrom. The droppings can be removed from the pan 19 when the wall forming member is disconnected from the extension 24.

Suspended from the ends of each frame and from the outer side rail of the frame 2 are foraminous panels acting as closures for the spaces between the frame and the pan 19. The panels are removable so that access can be had to the pan when desired. The panel which is suspended from one end of the frames 1, 2 is indicated at 28. The panel suspended from the outer side rail of the frame 2 is indicated at 29 and the panel suspended from the other end of the frames 1, 2 is indicated at 30. Suspension hooks 31 are provided for the panels and these latter are pivotally connected to the hooks as indicated at 32. The suspension hooks 31 are mounted on the end rails of the frames 1, 2 and the outer side rail of the frame 2. The panel 30 is arranged over the extension 24. Preferably each panel is provided with a pair of suspension hooks. See Figure 5. The panel in Figure 5 is indicated at 28. Each panel consists of a rectangular frame 33 having secured therein a length of wire mesh 34.

Positioned between each set of perch poles and the pan 19 is a foraminous arrester member carried by suspension hooks supported from the side rails of the frames. That arrester member which is positioned below the pole 7 is indicated at 35 and has its sides attached to suspension hooks 36, 36' which are detachably connected to the vertical legs 3 of the side rails of the frame 1. That arrester member which is positioned below the poles 8 is indicated at 37 and has its sides connected to suspension hooks 38, 38' which are supported from the side rails of the frame 1. Each arrester member is of the same length as, but of less width than the frame with which it is associated with or supported from. The inner sides of the arrester members align with the inner side rails of the frames. The outer sides of the arrester members are positioned inwardly with respect to the outer side rails of the frames. The hooks 36', 38' are connected to the inner sides of the arrester members and extend down through the space 6 between the frames. The hooks 36, 38 below the outer side rails of the frame extend inwardly and are connected to the outer sides of the arrester members. The inwardly extending portions of the hooks 36, 38 clear the side closure 29 and a nesting element to be presently referred to, and which constitutes a side closure. The droppings from the fowl pass through the arrester members into the pan 19 illustrated as supported from the outer side rail of the frame 1. The nesting element acts as a closure for the space between the outer side rail of the frame 1 and the corresponding side of the pan 19. When a nesting element is positioned at any of the other sides of the roost, the closure panel for such side is removed and employed for an open side. By this arrangement but three closure panels are necessary, as the nesting element functions as a closure for that side not provided with a panel. The nesting element 39 is disposed at an inclination with respect to the roost so that the eggs will roll down into a portion of said element, to be presently referred to, to be conveniently removed.

The nesting element 39 comprises a foraminous bottom 40, a foraminous rear wall 41, closed end walls 42, 43, a closed top 44, a foraminous front wall 45 provided with openings 46 for the passage of the fowl into the nest, a vertically disposed foraminous extension 47 and a horizontally disposed flat support or closure 48. The bottom 40 is of greater width than the top 44 and the front wall 45 is arranged inwardly with respect to the outer side of the bottom. The lower portion of each end wall is formed with an extension 49 which supports the member or support 48. See Figure 3. The support or member 48 is removable and forms in connection with the extensions 49, extension 47 and bottom 40 a closed pocket for receiving the eggs and these latter are rolled into the pocket owing to the angular disposition of the nesting element 39 with respect to the roost.

The element 39 includes a series of vertical partitions 50 which are interposed between the rear wall 41 and front wall 45 and which in connection with the bottom 40 provide a series of nests 51. The nests 51 open into the pocket referred to. At the bottom of each nest there is arranged a floor member 52, preferably of glass. The nesting element 39 is supported by hanger brackets 56 which extend over the vertical leg of the outer side rail of the frame 1.

Secured to the end of the nesting element 39 is a pair of laterally disposed arms 57 carrying a perch member 58 and the latter is provided with openings 59 to receive a vermin repellent. The perch 58 is positioned a substantial distance outwardly with respect to the member or support 48 which constitutes a closure for the pocket which communicates with the nest and receives the eggs therefrom.

The perch member 58 is preferably constructed of wood. The plates 52 preferably are constructed of glass and the remaining parts of the nesting element and roost, other than the perch bars, are constructed of metallic material.

It is thought the many advantages of a sanitary roost in accordance with this invention can be readily understood, and although the preferred embodiment of the invention is as illustrated and described, yet it is to be understood that changes in the details of construction can be had which fall within the scope of the invention as claimed.

What we claim is:

1. A poultry roost comprising an integral skeleton structure providing a pair of spaced, sidewise aligning, horizontally disposed, rectangular frames, said frames having certain of the rails thereof provided with spaced openings below the top edges of the rails, a set of spaced perch poles housed within each frame and mounted on those rails of the frame provided with openings, said perch poles positioned below the top edges of the rails, and spaced depending pins carried by each of said poles and extending through a pair of opposed openings for detachably securing the pole in position to arrest the shifting thereof when arranged in a frame.

2. A poultry roost comprising a horizontally disposed perch pole supporting frame having side and end rails integral with each other and each including a horizontal and a vertical leg, said horizontal legs extending inwardly from the bottom of the vertical legs, a pair of opposed horizontal legs forming seats and provided with spaced openings, the openings in one horizontal leg opposing the openings in the other horizontal leg, spaced perch poles mounted on said seats and having their ends opposing the inner faces of those vertical legs which project upwardly from said seats, and spaced depending pins carried by each pole and extending through a pair of opposed openings for detachably securing the pole in position within the frame and to arrest shifting of the pole when seated.

3. A poultry roost including a supporting structure formed with a pair of spaced, sidewise aligning, connected together, horizontally disposed rectangular frames having the rails thereof provided with means for housing and supporting therein perch poles in spaced relation, a pair of sidewise opposed foraminous arrester members positioned below said frame, each arrester member of less width than the width of that frame below which it is positioned, suspension hooks having their upper ends engaging over the inner side rails of said frames and connected with the inner sides of said arrester members, and suspension hooks engaging over the outer side rails of said frames, depending from the latter and extending inwardly with respect thereto and connected to the outer sides of said arrester members.

4. A poultry roost comprising a horizontally disposed, rectangular frame having the rails thereof provided with means for housing and supporting therein perch poles, said means positioned below the top edges of the rails, a foraminous arrester member positioned below and spaced from the frame and of less width than the width of the latter, suspension elements having the upper ends thereof engaging over the top edges of one side rail of the frame, depending from the latter and connected to one side of the arrester member, and suspension elements extending from the other side rail of the frame, extending inwardly with respect to the latter and connected to the other side of the arrester member.

5. A poultry roost comprising a horizontally disposed, rectangular frame having the rails thereof provided with means for housing and supporting therein perch poles, said means positioned below the top edges of the rails, a foraminous arrester member positioned below and spaced from the frame and of less width than the width of the latter, suspension elements having the upper ends thereof engaging over the top edges of one side rail of the frame, depending from the latter and connected to one side of the arrester member, suspension elements extending from the other side rail of the frame, extending inwardly with respect to the latter and connected to the other side of the arrester member, an inclined collecting pan arranged below and spaced throughout from said arrester member, and supporting means common to said frame and said pan.

6. In a poultry roost, a pair of spaced, sidewise arranged, horizontally disposed rectangular frames each including a pair of side and a pair of end rails integral with each other and with the inner side rail of one frame connected to the inner side rail of the other frame, each of said rails including a vertical and a horizontal leg and with the horizontal legs extending inwardly from the bottom of the vertical legs, opposed horizontal legs of each frame providing seats for supporting perch bars below the top edges of the vertical legs and with the inner faces of the vertical legs opposing the ends of the perch bars, supporting means for said frames adapted to have mounted therein a collecting pan common to both frames, a foraminous arresting means interposed between each frame and the pan and spaced throughout from the latter, means depending from the vertical legs of each side rail of each frame for suspending said arresting means, the means depending from the outer side rails extending inwardly with respect thereto, removable closures to prevent the entrance of fowls into the supporting means above the pan, and means detachably mounted on the outer side rail of each frame and the end rails of each frame for suspending said closures in position.

7. In a poultry roost, a skeleton supporting structure, said structure provided with means in proximity to its top for supporting therein perch poles, an inclined collecting pan arranged within said structure below and spaced from said means, said pan having an open end extended from said structure, the bottom of said pan adjacent said open end formed with spaced slots, and a removable wall forming member having depending lugs for extension through said slots to secure said member in closing position with respect to the pan at a point inwardly on the extended end of the latter.

In testimony whereof, we affix our signatures hereto.

KRISTOFFER M. JENSEN.
CASPER B. HUSCHKE.